UNITED STATES PATENT OFFICE.

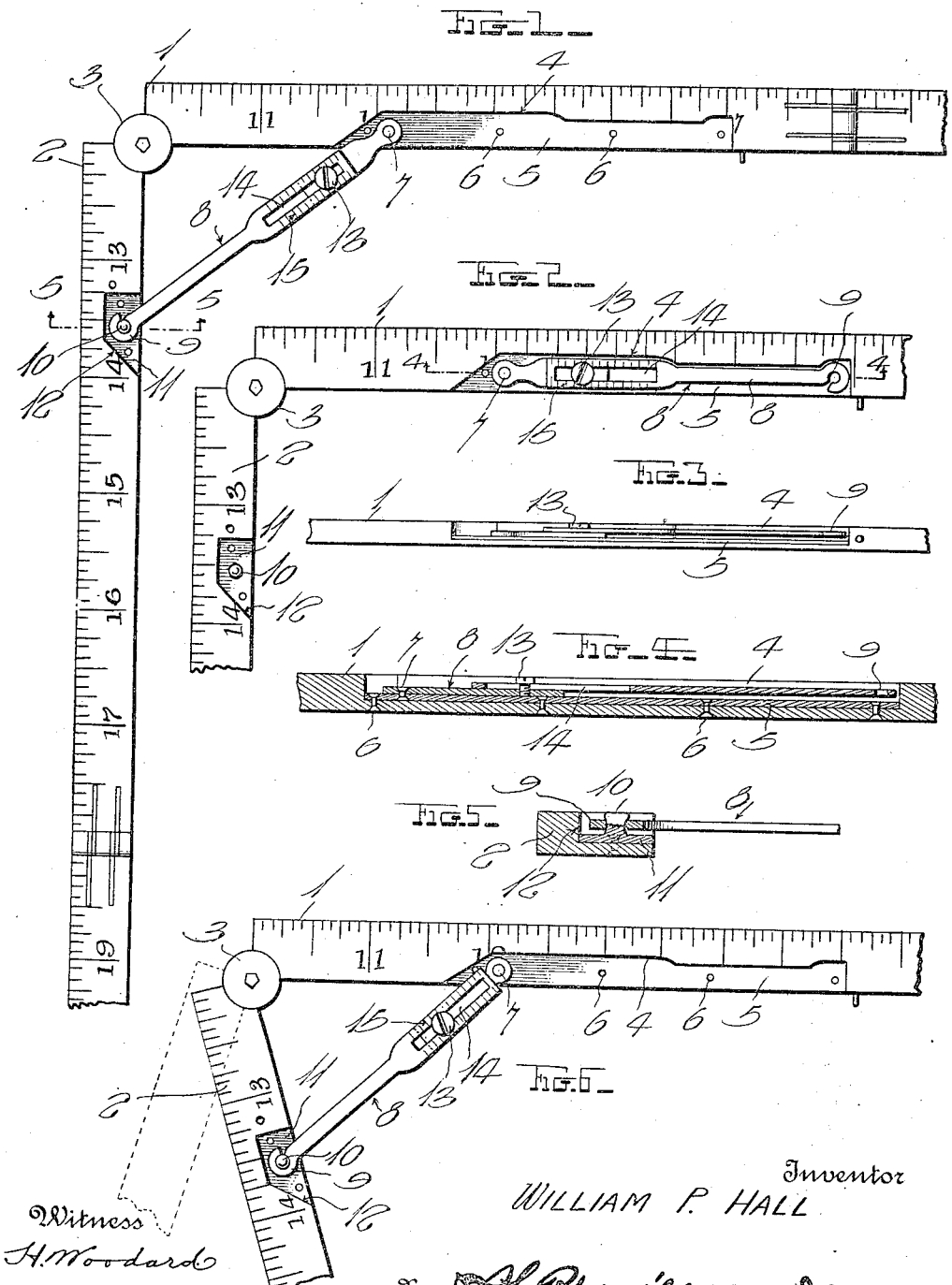
W. P. HALL.
COMBINED RULE AND SQUARE.
APPLICATION FILED NOV. 8, 1917.
1,289,047. Patented Dec. 24, 1918.

WILLIAM P. HALL, OF CEDAR FALLS, NORTH CAROLINA, ASSIGNOR TO MRS. LOU KENNEDY McALISTER, OF GUILFORD COUNTY, NORTH CAROLINA.

COMBINED RULE AND SQUARE.

1,289,047.

Specification of Letters Patent. Patented Dec. 24, 1918.

Application filed November 8, 1917. Serial No. 200,955.

*To all whom it may concern:*

Be it known that I, WILLIAM P. HALL, a citizen of the United States, residing at Cedar Falls, in the county of Randolph and State of North Carolina, have invented certain new and useful Improvements in Combined Rules and Squares; and I do declare the following to be a full, clear, and exact description of the invention, such as will enable others skilled in the art to which it appertains to make and use the same.

My invention has for its object to provide an extremely simple and inexpensive tool which may be used to equal advantage as a rule, as a right angular square, or as a miter square.

With the foregoing general object in view, the invention resides in the novel features of construction and unique combinations of parts to be hereinafter fully described and claimed, the descriptive matter being supplemented by the accompanying drawings which form a part of this specification and in which:

Figure 1 is a plan view of the improved tool extended for use as a square;

Fig. 2 is a view similar to Fig. 1 but showing the brace bar folded in readiness for folding of the entire device;

Fig. 3 is an edge view of a portion of Fig. 2;

Fig. 4 is an enlarged longitudinal section on the plane of the line 4—4 of Fig. 2;

Fig. 5 is a transverse section on the plane of the line 5—5 of Fig. 1; and

Fig. 6 is a view similar to Fig. 1 but illustrating the device when used as a miter square.

In the drawings above briefly described, the numerals 1 and 2 designate the usual folding arms of a rule, said arms being hinged together at 3 in the well known manner, so that the entire device may fold compactly when not in use. The arm 1 is provided with a longitudinal recess 4 extending along one of its edges, and a strip of metal 5 is secured to the bottom of this recess by rivets or the like 6. At 7, one end of a brace bar 8 is pivoted permanently to the strip 5, whereas the other end of said brace bar is provided with a split resilient eye 9 of a size to snap over a stud 10 when pressure is applied to said eye, said stud being carried by the arms 2, to which it is secured by means of a base plate 11 set within a suitable recess 12.

Normally, that is when the device is not in use, the brace bar 8 lies upon the strip 5 in the recess 4 as shown in Figs. 2, 3 and 4. When the rule is unfolded, however, this brace bar may be extended across the angle between the arms 1 and 2 as shown in Fig. 1, the eye 9 being then snapped over the stud 10 to hold said arms in a predetermined angular relation. In order that this relation may be varied, I preferably form the brace bar 8 of two overlapped sections slidably connected by a screw 13 passing through a slot 14. Suitable graduations 15 are provided on one section for coaction with the adjacent end of the other section, so that the length of the bar 8 may be varied according to the angle at which the arms 1 and 2 are to be set.

From the foregoing, taken in connection with the accompanying drawings, it will be obvious that I have provided an extremely simple tool which may be used as an ordinary rule, as a folding square, or as a bevel square for marking numerous angles. Since probably the best results are obtained from the specific details shown and described these details are preferably employed, but I wish it understood that within the scope of the invention as claimed, numerous minor changes may well be made.

I claim:

In combination with the two hingedly connected halves of a folding rule, each half having in one side near its inner end a shallow recess opening through its inner edge, one recess being relatively long and the other comparatively short, metal bottom strips secured in each recess, a brace bar adapted to extend across the angle between said halves when the rule is partly opened, one end of said brace being pivoted to one end of the bottom strip of said relatively long recess, said bar being foldable into said recess when the rule is to be folded, the other end of said bar having a split resilient eye, and a stud extending from the bottom strip of the short recess, the inner end of said stud being equal in diameter to the opening of said eye and the outer end of said stud being of slightly greater diameter, whereby said eye can be engaged with and disengaged from said stud only by snapping it over said enlarged outer end of the latter.

In testimony whereof I have hereunto set my hand in the presence of two subscribing witnesses.

WILLIAM P. HALL.

Witnesses:
H. B. BUIE,
C. H. JULIAN.

Copies of this patent may be obtained for five cents each, by addressing the "Commissioner of Patents, Washington, D. C."